Jan. 7, 1964  G. F. HAUSMANN  3,116,603
COMBINED NOZZLE COOLING AND THRUST VECTORING
Filed Aug. 15, 1961  2 Sheets-Sheet 1
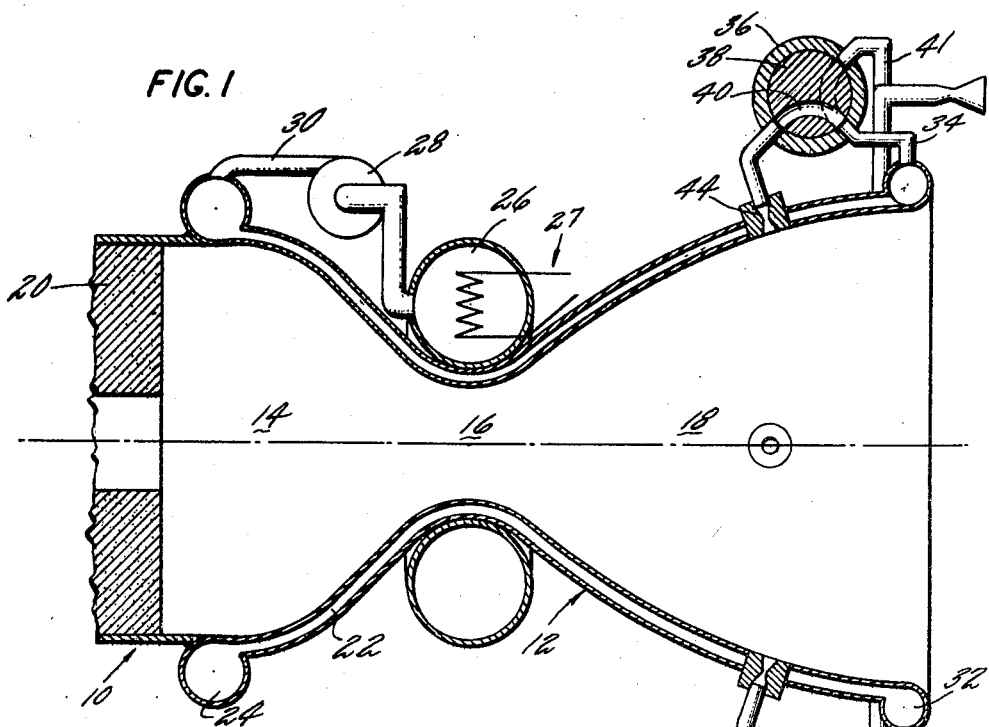
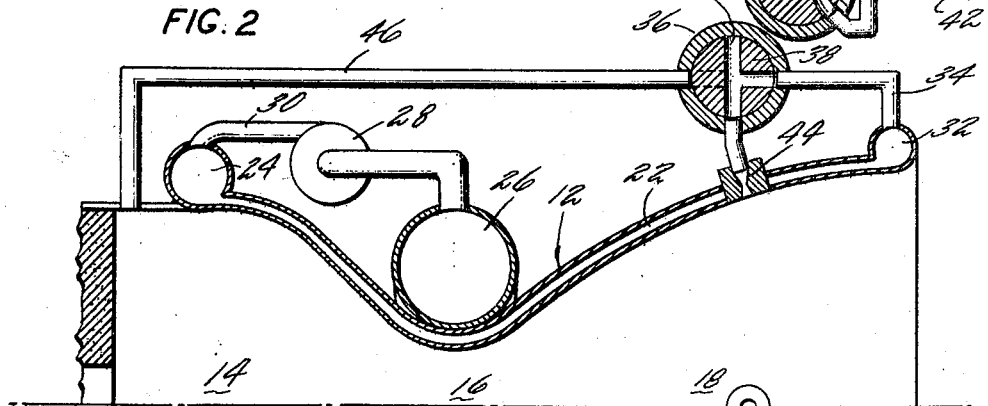
INVENTOR
GEORGE F. HAUSMANN
BY
AGENT Jan. 7, 1964 G. F. HAUSMANN 3,116,603
COMBINED NOZZLE COOLING AND THRUST VECTORING
Filed Aug. 15, 1961 2 Sheets-Sheet 2
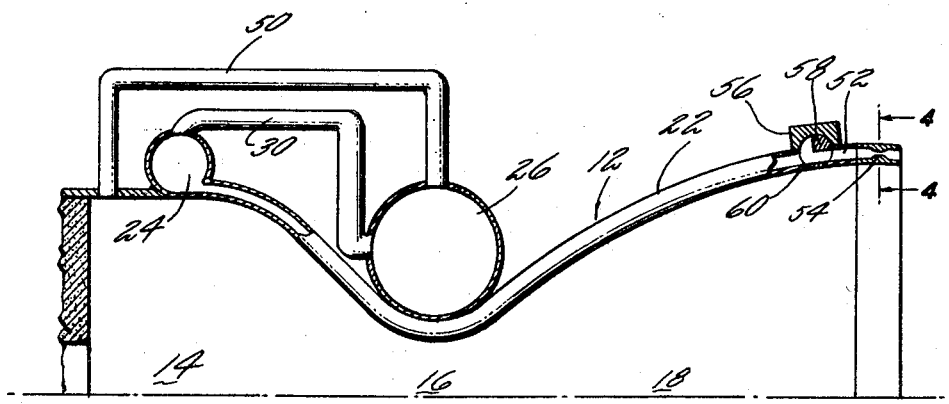
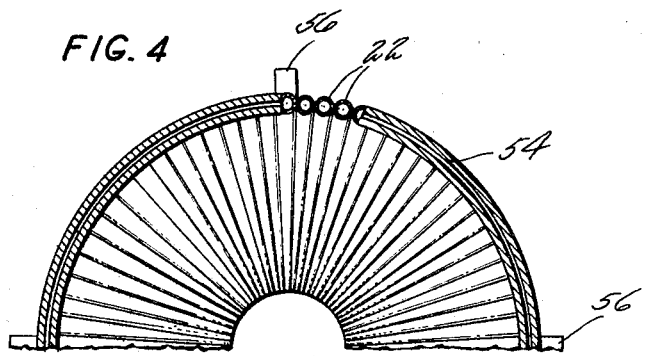
INVENTOR
GEORGE F. HAUSMANN
BY
AGENT United States Patent Office 3,116,603
Patented Jan. 7, 1964

3,116,603
COMBINED NOZZLE COOLING AND THRUST VECTORING
George F. Hausmann, Glastonbury, Conn., assignor to United Aircraft Corporation, East Hartford, Conn., a corporation of Delaware
Filed Aug. 15, 1961, Ser. No. 131,526
5 Claims. (Cl. 60—35.54)

This invention relates to a combined system for nozzle cooling and thrust vector control for a rocket engine. More particularly, it relates to a nozzle cooling and thrust vector control system which is especially advantageous for use in a solid propellant rocket engine.

In the past, several systems for steering rocket vehicles have been proposed, none of which has proved to be fully satisfactory. One suggested system involves the use of aerodynamic surfaces, but such a system is complicated, very heavy, and is operative only within the atmosphere.

Another proposed system is the use of gimballed or hinged connections between the rocket vehicle and the engine or nozzle. Gimballing the entire engine is impracticable in the case of solid propellant rockets since the engine constitutes a major portion of the vehicle structure, and gimballing of the nozzle alone produces serious problems involving gas seals and movable members operating at high temperature. Furthermore, such systems require high actuation forces which invariably significantly affect the weight and complexity of the control system.

It has been suggested to use auxiliary rockets for vector control, but the thrust required for directional control is such that the size of these auxiliary rockets adds considerable weight to the system.

Other systems have been proposed for introducing a mechanical device into the exit gas stream, but these systems are unsatisfactory because the device and actuating mechanism are exposed to the high temperature exhaust gases, and these devices cause a significant loss of specific impulse.

It has also been suggested that vectoring can be achieved by injecting a fluid into the exhaust nozzle to produce a shock wave. This system is considered attractive for nozzle steering purposes. However, a large supply of fluid is necessary to deliver the large quantities needed to accomplish injection thrust vectoring, and there is considerable room for improvement in reducing the fluid injection requirements and hence the fluid supply size.

Various systems have also been proposed for cooling rocket nozzles. In particular, it has been proposed to cool the nozzle of a liquid propellant rocket by circulating one of the liquid propellants through a cooling jacket surrounding the nozzle. However, once again, this system is not practicable for solid propellant rockets because of the significant weight penalty involved in carrying a separate supply of fluid and the pumping and control means therefor.

The present invention combines the operations of circulating fluid nozzle cooling and injection thrust vectoring into a unified system, thereby providing for the first time in solid rocket engines an effective cooling and thrust vectoring system with a minimum compromise in weight and complexity. The unified system eliminates a serious redundancy of components by using a single set of components for both thrust vectoring and nozzle cooling, and the unified system also reduces the amount of fluid needed for injection thrust vectoring. Also, the present invention teaches a unified thrust vectoring and nozzle cooling system which makes more attractive the use of both of these individual concepts in rocket engines in general.

The general concept of fluid injection thrust vectoring is disclosed in U.S. Patent 2,943,821, to which reference is hereby made for a complete discussion of this concept.

As has been previously stated, an objection to the use of the system in rocket engines in general, and solid propellant rockets in particular, is the weight penalty involved in carrying the large amount of fluid necessary for injection. In a liquid propellant rocket, a separate tank must be provided to store the injection fluid; or, in the event that one of the propellants can be used as the injection fluid, a larger supply of this fluid must be carried and special valving outlets must be provided to extract it from the tank for this special purpose. In a solid propellant rocket a separate tank and associated plumbing must be provided to carry and deliver the large amount of fluid needed to accomplish thrust vectoring by fluid injection.

As has also been pointed out above, cooling of a solid propellant nozzle by circulating a fluid around the nozzle has not been practicable because of the weight involved in carrying a separate tank and supply of cooling fluid.

The present invention teaches the use of a single fluid supply for nozzle cooling and injection thrust vectoring. In regard to solid propellant rockets, this accomplishes a considerable weight reduction by eliminating an entire fluid supply and storage tank. Thus, the new unified system makes it much more feasible to use the concepts of circulating fluid nozzle cooling and injection thrust vectoring in a solid propellant rocket because the added weight of a single fluid supply system of a size ordinarily needed to accomplish just one of these functions is tolerable when both nozzle cooling and injection thrust vectoring can be accomplished.

Furthermore, the present invention accomplishes an additional reduction in the amount of fluid needed to accomplish thrust vectoring by fluid injection, and this weight saving is realized in both liquid propellant and solid propellant rockets.

The total side force generated by fluid injection is made up of two distinct forces. One of these constituent forces is the force induced on the nozzle wall by the shock caused by fluid injection. This force is a direct function of the mass of injected fluid. The other constituent force is the reaction on the injection nozzle caused by injection. This force is a function of injection nozzle specific impulse and hence is a function $$\sqrt{\frac{T}{M}}$$

where T is the temperature of the injected fluid and M is the molecular weight of the injected fluid.

The present invention teaches using as the injection fluid the nozzle cooling fluid after it has performed its cooling function. The fluid then is at a considerably elevated temperature (contemplated to be about 2600° F. in the present invention) but is still capable of being valved with present day valve technology. The fluid requirements for injection thrust vectoring are normally greater than the fluid requirements for nozzle cooling. But, by using the nozzle cooling fluid after it has been heated, the desired side force can be generated with a smaller amount of fluid injection than would be needed if a fluid of lower temperature were used. Hence, the amount of fluid needed to perform both the nozzle cooling and injection thrust vectoring functions can be reduced to approximately the amount of fluid needed for cooling alone, and a significant weight having results in both liquid propellant and solid propellant rockets.

Furthermore, the present invention also teaches exhausting the cooling fluid rearwardly to produce forward thrust when not being used for injection thrust vectoring. Thus, the weight penalty for carrying the fluid is further reduced by using it to produce forward thrust when the fluid is not being used for vectoring.

Accordingly, one feature of the present invention is a system in which thrust vectoring and nozzle cooling are accomplished in a simple but effective way by passing a coolant through a cooling jacket surrounding the nozzle.

Another feature of the present invention is a novel system in which the vaporized coolant in a nozzle cooling jacket is either exhausted rearwardly through small auxiliary nozzles to produce additional thrust or is injected into the nozzle to produce vector control by producing a shock wave.

Still another feature of the present invention is a novel nozzle cooling and thrust vectoring system having greater simplicity and greater reliability than systems heretofore used.

Still another feature of the present invention is a novel cooling and thrust vectoring system for rocket nozzles using fixed auxiliary nozzles and in which the only moving parts are simple transfer valves removed from the flow of hot gases, thereby eliminating the insulation and actuation problems associated with moving nozzles and providing a higher degree of reliability than the previous systems have afforded.

Still another feature of the present invention is a novel nozzle cooling and thrust vectoring system in which a considerable weight reduction is achieved by using as a coolant the fluid which is injected into the nozzle to produce shock waves for thrust vectoring, thereby eliminating separate supply systems to perform both functions.

Still another feature of the present invention is a novel system in which the weight penalty associated with carrying a separate cooling and injection fluid is essentially completely compensated by exhausting the cooling fluid rearwardly through auixiliary nozzles to produce additional thrust.

Still another feature of the present invention is a novel injection thrust vectoring and nozzle cooling system for rocket engines wherein the quantity of fluid required for injection is significantly reduced by heating it before injection.

Still another feature of the present invention is a novel injection thrust vectoring and nozzle cooling scheme wherein a considerable weight saving is realized by utilizone fluid to perform both functions, and wherein a further weight saving is realized by heating the injection fluid prior to injection.

Other features and advantages will be apparent from the specification and claims, and from the accompanying drawings which illustrate an embodiment of the invention.

FIG. 1 is a sectional view of a rocket nozzle incorporating the present invention.

FIG. 2 is a sectional view of a rocket engine nozzle incorporating a modification of the present invention.

FIG. 3 is a sectional view of a modified rocket engine system incorporating the present invention wherein an alternate means of supplying the coolant is shown.

FIG. 4 is a view taken along line 4—4 of FIG. 3.

Referring to FIG. 1, rocket engine 10 has an exhaust nozzle 12 mounted thereon, the inner walls of which are shaped to define a convergent chamber 14, a throat 16 and a divergent chamber 18. Thrust is generated by burning solid grain propellant 20. A plurality of cooling tubes 22 extending in an axial direction conforming to the shape of nozzle 12 surround the nozzle and create a cooling jacket in heat exchange relationship with the nozzle. An inlet manifold 24 is attached to and communicates with the tubes 22 to form the inlet end of the cooling jacket. A source of coolant is stored in tank 26 and is delivered therefrom by pump 28 via line 30 to manifold 24, thence through the cooling tubes 22. Tank 26 preferably surrounds the throat 16 of nozzle 12 so as to absorb heat form this, the hottest part of the nozzle. Another manifold 32 is attached to and communicates with the cooling tubes 22 to form the discharge end of the cooling jacket.

The coolant stored in tank 26 is preferably lithium for several reasons. One reason is that its low molecular weight increases the injection nozzle specific impulse.

Also, lithium has a high specific heat and a high heat of vaporization and is a vapor at the contemplated coolant temperature. It is more effective to inject a vapor for thrust vectoring than to use a liquid, and the present invention contemplates a cooling jacket temperature sufficient to vaporize the coolant. Hence, because of the melting point of lithium, a preheater 27 is supplied to liquefy the lithium at start up, and to provide additional heat during operation if the heat absorbed in tank 26 from the throat 16 does not liquefy the lithium.

A number of tubes 34 lead from manifold 32, each tube 34 going to a transfer valve 36. Transfer valve 36 has a movable member 38 with a flow passage 40 therein. In one position of valve 36, the line 34 is connected via passage 40 and line 41 to auxiliary nozzle 42 spaced 180° from the associated injection port 44, and in the other position of valve 36, line 34 is connected via passage 40 to nozzle-shaped injection port 44 in the wall of nozzle 12. There are three or more, and preferably four, injection ports 44 spaced around the periphery of nozzle 12, and there is a line 34, a valve 36, an auxiliary nozzle 42 for each injection port 44.

Although three injection ports spaced 120° apart are acceptable, it is preferred that there be four nozzles spaced 90° apart, the ports 180° apart forming opposing pairs of injection points. In this preferred configuration, there are four auxiliary nozzles 42 spaced 90° apart and in radial planes with injection ports 44, the auxiliary nozzles 180° apart forming opposing pairs corresponding to the opposing pairs of injection ports.

In the operation of the system shown in FIG. 1, the coolant will be delivered from tank 26 to inlet manifold 24 by pump 28. The coolant then flows through cooling tubes 22 and is collected in discharge manifold 32. In normal operation no injection thrust vectoring is being accomplished, and the coolant will flow from manifold 32 through the line 34 to the passages 40 in each transfer valve 36, and thence via line 41 to the nozzle 42 associated with each valve 36. When it is desired to accomplish injection thrust vectoring, valve member 38 is rotated to connect line 34 to injection nozzle 44, and vaporized coolant is injected into chamber 28 of nozzle 12. This fluid injection causes an outwardly directed side force on the wall of the nozzle in the vicinity of the point of injection. Assuming the center of gravity of the rocket to be upstream of the injection point, as it invariably will be, the injection causes a counterclockwise moment about the center of gravity to be exerted on the rocket in the radial plane of fluid injection. Movement of valve member 38 to deliver coolant to injection port 44 simultaneously cuts off the supply of coolant fluid to the auxiliary nozzle 42 spaced 180° from the injection port. The cessation of coolant flow to this one auxiliary nozzle of an ordinarily balanced pair results in an additional counterclockwise moment about the center of gravity of the vehicle, because coolant is still being exhausted through the auxiliary nozzle which is in a plane of radial alignment with the activated injection port 42.

Referring now to FIG. 2 wherein like parts are numbered as in FIG. 1, a modification of the present invention is shown. In the structure of FIG. 2, a line 46 leads from transfer valve 36 to convergent chamber 14. Movable member 38 of transfer valve 36 has a T-shaped channel 48 which in one position connects line 34 to injection port 44 while closing off line 46 from line 34, and when rotated counterclockwise 90° to a second position connects line 34 to line 46 while shutting off line 34 from injection port 44. Thus, the cooling fluid discharged from tubes 22 to the manifold 32 is normally delivered via lines 34 and 46 to convergent chamber 14 where it is utilized to produce additional thrust internally of the rocket rather than by external auxiliary nozzles as in FIG. 1. When injection thrust vectoring is desired, member 38 is moved to connect line 34 to injection port 44 to inject coolant fluid at one point into chamber 18.

Referring now to FIG. 3, another modification of the present invention is shown in which like parts are numbered as in FIG. 1. In the configuration of FIG. 3, a line 50 bleeds combustion gas from chamber 14 to storage tank 26 to pressurize the coolant. Pressurized coolant flows from tank 26 via line 30 to inlet manifold 24, and thence through cooling tubes 22. The cooling tubes 22 all discharge into an annular chamber 52, and the coolant is then exhausted rearwardly through an annular nozzle 54 to provide additional thrust. A transfer valve 56 having a movable member 58 therein delivers the coolant from tubes 22 to chamber 52 when the movable member 58 is in the position shown in FIG. 3. Rotation of member 58 90° in a counterclockwise direction delivers coolant from tube 22 into chamber 18 through the opening 60 in tube 22 for thrust vectoring purposes. Thus, both nozzle cooling and injection thrust vectoring can be accomplished with the structure shown in FIG. 3.

The annular nozzle 54 is shown in FIG. 4. An annular nozzle is preferable over individual nozzles attached to the end of each tube 22, because in the event that a tube 22 becomes clogged, annular chamber 52 will serve as a manifold and equally distribute and exhaust the coolant through nozzle 54. Thus, during normal operation and when injection thrust vectoring is instituted at one point in nozzle 12, the thrust generated by nozzle 54 remains balanced, and a closer control can be obtained over thrust vectoring.

It is to be understood that the invention is not limited to the specific embodiment herein illustrated and described but may be used in other ways without departure from its spirit as defined by the following claims.

I claim:

1. In a rocket engine having an exhaust nozzle including a convergent inlet portion, a throat, and a divergent discharge portion, a cooling jacket surrounding at least part of said nozzle, a source of coolant connected to said cooling jacket, means for delivering said coolant to said cooling jacket, valve means connected to the discharge end of said cooling jacket, first injection means connected to said valve means for delivering said coolant from said cooling jacket to the divergent portion of said nozzle for injection to create a shock wave in said nozzle for directional control, and second injection means connected to said valve means for injecting said coolant into the convergent portion of said nozzle to expand said coolant in said nozzle for the generation of thrust, said valve means selectively delivering the discharge from said cooling jacket into said nozzle through one of said injection means.

2. In a rocket engine having a discharge nozzle having supersonic flow therein, a cooling jacket surrounding at least a part of said nozzle, a source of coolant connected to said cooling jacket, means for delivering said coolant to said cooling jacket, at least two injection means for injecting fluid into said nozzle to generate shock waves for directional control, said injection means being spaced 180° apart and forming a pair of opposed injection means, at least two auxiliary nozzles connected to said cooling jacket for expanding said coolant to produce thrust, said auxiliary nozzles being spaced 180° apart and in alignment with said injection means, said auxiliary nozzles forming a pair of opposed nozzles corresponding to the pair of opposed injection means, means connecting each injection means with the auxiliary nozzle spaced 180° therefrom to form an alternate coolant flow path, and means for selectively discharging the coolant from said cooling jacket through both of said nozzles or through one of said nozzles and through the injection means spaced 180° from said one nozzle.

3. In a rocket engine having a discharge nozzle with supersonic flow therein, a cooling jacket surrounding at least a part of said nozzle, a source of coolant connected to said cooling jacket, means for delivering said coolant to said cooling jacket, at least two fluid injection means spaced 180° apart and forming a pair of opposed injection means for injecting fluid into said nozzle for directional control, at least two auxiliary nozzles for the expansion of fluid for thrust connected to said cooling jacket, said auxiliary nozzles being spaced 180° apart and in alignment with said injection means, means for interconnecting each of said injection menas and the auxiliary nozzle spaced 180° therefrom with the cooling jacket, and means in each interconnecting means for selectively delivering coolant to an injection means or the auxiliary nozzle connected thereto.

4. In a rocket engine having a main discharge nozzle with supersonic flow therein, a cooling jacket surrounding at least a part of said nozzle, a source of coolant connected to said cooling jacket, means for delivering said coolant to said cooling jacket, an annular manifold connected to the discharge end of said cooling jacket, an annular nozzle surrounding said main discharge nozzle, said annular nozzle being connected to said manifold to discharge said coolant in the direction of discharge from said main nozzle, means for injecting coolant from said cooling jacket into said main nozzle to produce a shock wave for directional control, and means for selectively delivering part of said coolant from said cooling jacket to said injection means.

5. In a rocket engine having a main discharge nozzle with supersonic flow therein, a cooling jacket surrounding at least a part of said nozzle, said cooling jacket including a plurality of tubes extending longitudinally along said nozzle, a source of coolant connected to said cooling jacket, means for delivering said coolant to said cooling jacket, an annular manifold connected to the discharge end of said plurality of tubes to receive the discharge of coolant therefrom, an annular nozzle surrounding said main nozzle, said annular nozzle being connected to said manifold to discharge said coolant in the direction of discharge from said main nozzle, and means, including valve means, for selectively injecting coolant from at least one of said tubes into said main nozzle to generate a shock wave in said nozzle for directional control.

References Cited in the file of this patent

UNITED STATES PATENTS

| 2,728,191 | Casey | Dec. 27, 1955 |
|---|---|---|
| 2,770,097 | Walker | Nov. 13, 1957 |
| 2,916,873 | N. K. Walker | Dec. 15, 1959 |
| 2,943,821 | Wetherbee | July 5, 1960 |
| 2,952,123 | Rich | Sept. 13, 1960 |
| 2,975,592 | Fox | Mar. 21, 1961 |
| 3,026,806 | Runton et al. | Mar. 27, 1962 |
| 3,036,430 | Eggers et al. | May 29, 1962 |
| 3,069,850 | Ledwith et al. | Dec. 25, 1962 |
| 3,070,957 | McCorkle | Jan. 1, 1963 |
| 3,092,963 | Lawrence | June 11, 1963 |

FOREIGN PATENTS

| 1,197,701 | France | June 8, 1959 |